United States Patent
He et al.

(10) Patent No.: US 11,045,788 B1
(45) Date of Patent: Jun. 29, 2021

(54) NEAR-INFRARED REGENERATIVE INTELLIGENT FIBER-BASED ADSORPTIVE MATERIAL AND PREPARATION METHOD AND USE THEREOF

(71) Applicant: GUANGXI UNIVERSITY, Guangxi (CN)

(72) Inventors: Hui He, Guangxi (CN); Chengrong Qin, Guangxi (CN); Shuangfei Wang, Guangxi (CN); Rimei Chen, Guangxi (CN); Xiaoyu Shi, Guangxi (CN); Jiehan Lin, Guangxi (CN); Chao Zhao, Guangxi (CN); Qin Lu, Guangxi (CN)

(73) Assignee: GUANGXI UNIVERSITY, Guangxi (CN)

( * ) Notice: Subject to any disclaimer, the term of this patent is extended or adjusted under 35 U.S.C. 154(b) by 0 days.

(21) Appl. No.: 16/899,508

(22) Filed: Jun. 11, 2020

(30) Foreign Application Priority Data

Apr. 14, 2020 (CN) .......................... 202010291397.X

(51) Int. Cl.
| | |
|---|---|
| *B01J 20/20* | (2006.01) |
| *B01D 53/04* | (2006.01) |
| *B01J 20/26* | (2006.01) |
| *B01J 20/32* | (2006.01) |
| *B01J 20/34* | (2006.01) |
| *B01D 53/62* | (2006.01) |
| *B01D 53/50* | (2006.01) |
| *B01D 53/52* | (2006.01) |
| *B01D 53/82* | (2006.01) |
| *B01D 53/96* | (2006.01) |
| *B01J 20/28* | (2006.01) |

(52) U.S. Cl.
CPC .......... *B01J 20/264* (2013.01); *B01D 53/508* (2013.01); *B01D 53/52* (2013.01); *B01D 53/62* (2013.01); *B01D 53/82* (2013.01); *B01D 53/96* (2013.01); *B01J 20/28023* (2013.01); *B01J 20/3208* (2013.01); *B01J 20/3219* (2013.01); *B01J 20/3278* (2013.01); *B01J 20/3293* (2013.01); *B01J 20/3425* (2013.01); *B01J 20/3441* (2013.01); *B01D 2251/80* (2013.01); *B01D 2257/302* (2013.01); *B01D 2257/304* (2013.01); *B01D 2257/504* (2013.01)

(58) Field of Classification Search
CPC .......... B01J 20/264; B01J 20/28023; B01J 20/3208; B01J 20/3219; B01J 20/3278; B01J 20/3293; B01J 20/3425; B01J 20/3441; B01D 53/508; B01D 53/62; B01D 53/82; B01D 53/96; B01D 53/04; B01D 2251/80; B01D 2257/302; B01D 2257/304; B01D 2257/504
USPC ...... 95/139, 148, 137, 136; 96/108; 502/401
See application file for complete search history.

(56) References Cited

U.S. PATENT DOCUMENTS

| | | | | |
|---|---|---|---|---|
| 7,655,070 | B1 * | 2/2010 | Dallas ................... | B01D 39/04 95/154 |
| 8,420,567 | B1 * | 4/2013 | Naumann ............... | A61L 15/60 502/402 |
| 2008/0251081 | A1 * | 10/2008 | Claussen ............. | A61M 16/105 128/205.27 |
| 2012/0076711 | A1 * | 3/2012 | Gebald ............... | B01J 20/28066 423/228 |
| 2016/0199810 | A1 * | 7/2016 | Goeppert ................ | C07C 41/01 423/418.2 |

FOREIGN PATENT DOCUMENTS

WO WO91/19675 * 12/1991

* cited by examiner

*Primary Examiner* — Frank M Lawrence, Jr.
(74) *Attorney, Agent, or Firm* — JCIP Global Inc.

(57) ABSTRACT

The present invention discloses a near-infrared regenerative intelligent fiber-based adsorptive material and a preparation method and use thereof. The material is obtained by chemically grafting a stepwise dual-temperature stimuli-responsive polyethyleneimine onto a carboxylated cellulose nanofiber matrix to prepare a stepwise dual-temperature stimuli-responsive intelligent nanofiber, and combining the stepwise dual-temperature stimuli-responsive intelligent nanofiber with a photosensitizer having near-infrared stimuli-response to prepare a stepwise dual-temperature/near-infrared stimuli-responsive intelligent nanofiber, and then by using a crosslinking agent to directly crosslink and combine the stepwise dual-temperature/near-infrared stimuli-responsive intelligent nanofiber with a hyperbranched polyamine in one step. The material has a stepwise dual-temperature/near-infrared stimuli-response, high density of amino group (greater than 14 mmol/g), and nano cavities.

18 Claims, No Drawings

NEAR-INFRARED REGENERATIVE INTELLIGENT FIBER-BASED ADSORPTIVE MATERIAL AND PREPARATION METHOD AND USE THEREOF

CROSS-REFERENCE TO RELATED APPLICATION

This application claims the priority benefit of China application serial no. 202010291397.X, filed on Apr. 14, 2020. The entirety of the above-mentioned patent application is hereby incorporated by reference herein and made a part of this specification.

TECHNICAL FIELD

The present invention belongs to the technical field of biomass fiber modification, and specifically relates to a near-infrared regenerative intelligent fiber-based adsorptive material and a preparation method and use thereof.

BACKGROUND

At present, the capturing method of acidic gas mainly includes absorption method, membrane separation method, adsorption method and deep condensation method. Particularly, the absorption method can realize efficient separation of a large amount of acidic gas with high purification degree and recovery, but the energy consumption of regeneration thereof is high and severe corrosion is brought to equipment. The membrane separation method uses different relative permeabilities of a macromolecular polymer to different gases to separate the gases, with simple equipment, convenient operation and low energy consumption, but it is hard to obtain acidic gas with high purity and regeneration capacity of the membrane material is poor, restricting its large-scale industrialized application. The deep condensation method subjects the raw gas to multi-compress and cooling so as to liquefy the gas, but such method is only suitable for acidic gas with high concentration. The adsorption method is to selectively capture and separate the acidic gas based on surface active sites of the porous materials, having advantages such as flexibility of operation and low cost of operation. However, the conventional adsorptive materials for acidic gas are facing issues that it is difficult to have both high adsorption capacity and low regeneration temperature.

SUMMARY

The objective of the present invention is to provide a near-infrared regenerative intelligent fiber-based adsorptive material and a preparation method thereof. The material has a stepwise dual-temperature/near-infrared stimuli-response, high density of amino group, and nano cavities, enabling the material to have properties of both high adsorption capacity to acidic gas and low regeneration temperature, and realizing low-temperature desorption and regeneration under near-infrared light.

The above-mentioned objective of the present invention is achieved by the following technical solution.

A near-infrared regenerative intelligent fiber-based adsorptive material is obtained by chemically grafting a stepwise dual-temperature stimuli-responsive polyethyleneimine onto a carboxylated cellulose nanofiber matrix to prepare a stepwise dual-temperature stimuli-responsive intelligent nanofiber, combining the stepwise dual-temperature stimuli-responsive intelligent nanofiber with a photosensitizer having near-infrared stimuli-response to prepare a stepwise dual-temperature/near-infrared stimuli-responsive intelligent nanofiber, and using a crosslinking agent to directly crosslink and combine the stepwise dual-temperature/near-infrared stimuli-responsive intelligent nanofiber with a hyperbranched polyamine in one step; wherein a stepwise dual-temperature stimuli-response of the near-infrared regenerative intelligent fiber-based adsorptive material is a stimuli-response with two temperature stages, where lower critical solution temperatures thereof respectively range from 30-37° C. and from 40-50° C.;

wherein the stepwise dual-temperature stimuli-responsive polyethyleneimine is obtained by evenly mixing in proportion a polyethyleneimine modified by N-isopropyl acrylamide and a polyethyleneimine modified by dimethylamino ethyl methacrylate; the carboxylated cellulose nanofiber is prepared by oxidizing paper pulp fiber with sodium periodate and TEMPO (2,2,6,6-tetramethylpiperidine-1-oxyl), where the carboxylated cellulose nanofiber has a large amount of carboxyl groups thereon; the photosensitizer having near-infrared stimuli-response is polydopamine, where under ultrasonic treatment, while polymerized into polydopamine, dopamine is combined with the stepwise dual-temperature stimuli-responsive intelligent nanofiber into the stepwise dual-temperature/near-infrared stimuli-responsive intelligent nanofiber to form a composite structure having interpenetrating network; the hyperbranched polyamine is obtained by a Michael addition reaction and a self-condensation reaction of an aminating reagent with methyl acrylate; and the crosslinking agent is epichlorohydrin.

Preferably, the paper pulp fiber is one or a mixture of more of bagasse pulp fiber, *Eucalyptus* pulp fiber, bamboo pulp fiber, masson pine pulp fiber and wheat straw pulp fiber.

The preparation method for a near-infrared regenerative intelligent fiber-based adsorptive material includes the following preparation steps:

S1, preparation of a carboxylated cellulose nanofiber: selectively oxidizing hydroxyl groups at C2 and C3 positions of a cellulose structural unit of paper pulp fiber into aldehyde groups by using sodium periodate to prepare dialdehyde fiber; then oxidizing the aldehyde groups at the C2 and C3 positions and a hydroxyl group at a C6 position of the cellulose structural unit of the dialdehyde fiber into carboxyl groups by using a TEMPO reagent, and regulating and controlling an oxidation degree by controlling the reaction conditions to prepare the carboxylated cellulose nanofiber;

S2, preparation of a stepwise dual-temperature stimuli-responsive polyethyleneimine: respectively subjecting N-isopropyl acrylamide and dimethylamino ethyl methacrylate to Michael addition reactions with polyethyleneimine, then evenly mixing in proportion to enable a modified polyethyleneimine to have stepwise dual-temperature stimuli-response;

S3, preparation of a stepwise dual-temperature stimuli-responsive intelligent nanofiber: subjecting the carboxylated cellulose nanofiber and the stepwise dual-temperature stimuli-responsive polyethyleneimine to an amidation reaction at high temperature;

S4, preparation of a stepwise dual-temperature/near-infrared stimuli-responsive intelligent nanofiber: mixing the stepwise dual-temperature stimuli-responsive intelligent nanofiber with dopamine, and dispersing evenly, then under ultrasonic treatment, polymerizing dopamine into polydopamine and meanwhile combining dopamine with the stepwise dual-temperature stimuli-responsive intelligent nanofiber to form a composite structure having interpenetrating network, and obtaining the stepwise dual-temperature/near-infrared stimuli-responsive intelligent nanofiber through centrifugation and freeze-drying;

S5, preparation of a hyperbranched polyamine: subjecting an aminating reagent and methyl acrylate to a Michael addition reaction to generate a hyperbranched polyamine precursor, where the hyperbranched polyamine is generated by a self-condensation reaction of the hyperbranched polyamine precursor; and S6, one-step crosslink by using a crosslinking agent: evenly mixing the stepwise dual-temperature/near-infrared stimuli-responsive intelligent nanofiber prepared in the step S4 and the hyperbranched polyamine prepared in the step S5 in an alkaline solution, adding a crosslinking agent epichlorohydrin under stirring, where a mixed solution is directly crosslinked into solid particles to obtain the near-infrared regenerative intelligent fiber-based adsorptive material.

Further, specific operation of the step S1 is as follows: adding a potassium hydrogen phthalate buffer solution to the paper pulp fiber, then adding sodium periodate, reacting for 3.5-4.5 hours under stirring at 30-40° C., and finally adding ethylene glycol to terminate the reaction, washing, drying to obtain the dialdehyde fiber, where a mass ratio of the paper pulp fiber to sodium periodate is 4:2 to 4:3; adding a sodium phosphate buffer solution to the dialdehyde fiber, evenly mixing at 55-65° C., then adding TEMPO, adding a sodium hypochlorite solution, then adding sodium chlorite, oxidizing for 15-17 hours, adding ethanol for quenching, washing, drying to obtain the carboxylated cellulose nanofiber, where a mass ratio of the dialdehyde fiber to TEMPO is 400:6 to 400:7.

Further, specific operation of the step S2 is as follows: at 55-65° C. under magnetic stirring, dropwise adding a polyethyleneimine aqueous solution with a concentration of 0.15-0.25 g/mL to a N-isopropyl acrylamide aqueous solution with a concentration of 0.03-0.09 g/mL according to a volume ratio of 1:3, and after reacting for 22-26 hours, quenching with liquid nitrogen, dialyzing an obtained solution with a MWCO500D dialysis bag in water for 22-26 hours, then freeze-drying to obtain a polyethyleneimine modified by N-isopropyl acrylamide, where regulating and controlling a lower critical solution temperature of a lower temperature stage within the range of 30–37° C. by controlling an addition amount of N-isopropyl acrylamide; at 55-65° C. under magnetic stirring, dropwise adding a polyethyleneimine aqueous solution with a concentration of 0.06-0.07 g/mL to a dimethylamino ethyl methacrylate aqueous solution with a concentration of 0.05-0.10 g/mL according to a volume ratio of 1:1, and after reacting for 22-26 hours, quenching with liquid nitrogen, dialyzing an obtained solution with the MWCO500D dialysis bag in water for 22-26 hours, then freeze-drying to obtain a polyethyleneimine modified by dimethylamino ethyl methacrylate, where regulating and controlling a lower critical solution temperature of a higher temperature stage within the range of 40–50° C. by controlling an addition amount of dimethylamino ethyl methacrylate; mixing the polyethyleneimine modified by dimethylamino ethyl methacrylate and the polyethyleneimine modified by N-isopropyl acrylamide according to a mass-equivalent ratio to obtain the stepwise dual-temperature stimuli-responsive polyethyleneimine.

Further, specific operation of the step S3 is as follows: dispersing the stepwise dual-temperature stimuli-responsive polyethyleneimine and the carboxylated cellulose nanofiber into water according to a mass ratio of 1:1 to 2.7:1, and after ultrasonic treatment, reacting at 100° C. for 9-10 hours, then centrifuging until a supernatant shows neutral, freeze-drying a precipitate to obtain the stepwise dual-temperature stimuli-responsive intelligent nanofiber.

Further, specific operation of the step S4 is as follows: adding an ammonium hydroxide solution to a mixed solution of ethanol and water to obtain a mixed solution of ethanol/water/ammonium hydroxide, mixing evenly, dissolving dopamine hydrochloride powder in water, then mixing the stepwise dual-temperature stimuli-responsive intelligent nanofiber and a dopamine aqueous solution in the mixed solution of ethanol/water/ammonium hydroxide, reacting in dark with stirring for 5-8 hours under ultrasonic treatment, and washing with water after the reaction is finished, dispersing again into water, centrifuging a mixture and freeze-drying; a mass ratio of dopamine hydrochloride to the stepwise dual-temperature stimuli-responsive intelligent nanofiber is 0.2:1 to 0.8:1.

Further, specific operation of the step S5 is as follows: dissolving the aminating reagent in absolute methanol according to a volume ratio of 9:5 to 10:5, dissolving methyl acrylate in absolute methanol according to a volume ratio of 2:5 to 3:5, charging nitrogen into the aminating reagent solution, dropwise adding the methyl acrylate solution to the aminating reagent solution according to a volume ratio of 1:1 at 0° C. under stirring, then reacting at normal temperature for 18-24 hours to obtain the hyperbranched polyamine precursor, evaporating the hyperbranched polyamine precursor at 60-70° C. for 0.5-1.5 hours, then increasing the temperature to 100° C. and 140° C. successively and reacting respectively for 2-3 hours to obtain the hyperbranched polyamine; the aminating reagent is diethylenetriamine, triethylenetetramine or tetraethylenepentamine.

Further, specific operation of the step S6 is as follows: mixing the stepwise dual-temperature/near-infrared stimuli-responsive intelligent nanofiber and the hyperbranched polyamine according to a mass ratio of 1:1:1:7, then dispersing in a 1-4 wt % NaOH aqueous solution, adding epichlorohydrin under stirring at a speed of 100-800 r/min for a crosslinking reaction for 10-30 minutes to obtain the near-infrared regenerative intelligent fiber-based adsorptive material; a mass ratio of the stepwise dual-temperature/near-infrared stimuli-responsive intelligent nanofiber to epichlorohydrin is 1:0.3 to 1:0.8, and a mass/volume ratio of the stepwise dual-temperature/near-infrared stimuli-responsive intelligent nanofiber to the NaOH aqueous solution is 1 g:100 ml to 1 g:300 mL.

The near-infrared regenerative intelligent fiber-based adsorptive material can be used in capturing an acidic gas, wherein the acidic gas is carbon dioxide, sulfur dioxide or hydrogen sulfide; after saturated adsorption of the acidic gas, the material achieves low-temperature desorption and regeneration under near-infrared light, that is, by using interval irradiation of 808 nm near-infrared light, the material is enabled to reach a temperature of 37° C. and maintain for 5-10 minutes, and then to reach a temperature up to 50° C. and maintain for 5-10 minutes, so as to achieve the desorption and regeneration of the material, where a regeneration rate is more than 95%.

The present invention has the following beneficial effects.

(1) The near-infrared regenerative intelligent fiber-based adsorptive material prepared by the present invention has a stepwise dual-temperature/near-infrared stimuli-response. The stepwise dual-temperature stimuli-response of the material decreases a regeneration temperature of the material after adsorption of the acidic gas. The material has high density of amino group (greater than 14 mmol/g) and nano cavities, which accelerates the adsorption of acidic gas (an adsorption capacity is greater than 7 mmol/g). The material can achieve near-infrared desorption and regeneration through the near-infrared stimuli-response (a regeneration rate is greater than 95%), and a temperature of the material is 55-65° C. under near-infrared light, indicating a relatively low regeneration temperature, enabling the material to have properties of both high adsorption capacity to acidic gas and low regeneration temperature, overcoming the issue that it is difficult for the conventional adsorptive material for acidic gas to have both high adsorption capacity to acidic gas and low regeneration temperature.

(2) The stepwise dual-temperature/near-infrared stimuli-response is established on the material by the present invention. During preparation, polydopamine that provides the near-infrared stimuli-response and the stepwise dual-temperature stimuli-responsive intelligent nanofiber form an interpenetrating network having a stable structure. Through the synergetic effect of dual-temperature stimuli-response and near-infrared stimuli-response, the material is enabled to have a gradually increased temperature by using the near-infrared light, and the dual-temperature stimuli-response is triggered stepwise, so that molecular chain of the material shrinks twice, and a stepwise transition of hydrophilic state to hydrophobic, and more hydrophobic state takes place, accelerating the acidic gas to be desorbed gradually from the material after saturated adsorption, and realizing complete desorption and regeneration. The present invention establishes a novel desorption manner of near-infrared low-temperature desorption, and the material achieves in situ low-temperature regeneration.

(3) During desorption, molecular chain of the material that is subjected to saturated adsorption of acidic gas shrinks due to its temperature-sensitive effect, and desorption of gas is accelerated. By using the stepwise dual-temperature stimulus, molecular chain of the material shrinks gradually which is conducive to the release of acidic gas step by step.

(4) The present invention inventively established a desorption manner of dual-temperature-sensitive switch triggered by near-infrared light, which is a novel low-temperature desorption manner. Compared with the conventional "outside-in" high-temperature desorption manner using water bath heating, the present invention provides an "inside-out" desorption manner which obtains heat by directly irradiating the material, being a more energy-saving desorption manner.

DETAILED DESCRIPTION

Embodiment 1

S1. Preparation of a carboxylated cellulose nanofiber: 4 g of absolute dry bagasse pulp fiber was added to a conical flask, 200 mL of a potassium hydrogen phthalate buffer solution (0.05M, pH=3) and then 2.0 g of sodium periodate were added, and after the conical flask was wrapped with tinfoil, a mixture in the conical flask was stirred at 30° C. for 4.5 hours followed by adding 10 mL of ethylene glycol to terminate the reaction. A product was subjected to suction filtration, washed and dried to obtain dialdehyde fiber. 2 g of dialdehyde fiber was added with 180 mL of a sodium phosphate buffer solution (0.05M, pH=6.8), and a suspension liquid was stirred at 55° C. in a sealed flask with a stirring speed of 500 rpm, then 0.030 g of TEMPO, subsequently 1.183 mL of a 1.69M sodium hypochlorite solution and finally 2.1307 g of sodium chlorite were added. After 17 hours of oxidation, 5 mL of ethanol was added for quenching, and the carboxylated cellulose nanofiber was obtained after washing and drying.

S2. Preparation of a stepwise dual-temperature stimuli-responsive polyethyleneimine: 1.5 g of polyethyleneimine was dissolved in 10 mL of water, and 0.9 g of N-isopropyl acrylamide was dissolved in 30 mL of water. At 55° C. under magnetic stirring, 10 mL of the polyethyleneimine aqueous solution was dropwise added to 30 mL of the N-isopropyl acrylamide aqueous solution, and after 22 hours of reaction, quenching was carried out by using liquid nitrogen. All solutions obtained were dialyzed with the MWCO500D dialysis bag in water for 22 hours, and then freeze-dried to obtain the polyethyleneimine modified by N-isopropyl acrylamide. Lower critical solution temperature (LCST) of a lower temperature stage was regulated and controlled within the range of 30–37° C. by controlling an addition amount of N-isopropyl acrylamide. 1.8 g of polyethyleneimine was dissolved in 30 mL of water, and 1.5 g of dimethylamino ethyl methacrylate was dissolved in 30 mL of water. At 55° C. under magnetic stirring, 30 mL of the polyethyleneimine aqueous solution was dropwise added to 30 mL of the dimethylamino ethyl methacrylate aqueous solution, and after 22 hours of reaction, quenching was carried out by using liquid nitrogen. All solutions obtained were dialyzed with the MWCO500D dialysis bag in water for 22 hours, and then freeze-dried to obtain the polyethyleneimine modified by dimethylamino ethyl methacrylate. Lower critical solution temperature (LCST) of a higher temperature stage was regulated and controlled within the range of 40–50° C. by controlling an addition amount of dimethylamino ethyl methacrylate. The polyethyleneimine modified by dimethylamino ethyl methacrylate and the polyethyleneimine modified by N-isopropyl acrylamide were mixed according to a mass-equivalent ratio, and the stepwise dual-temperature stimuli-responsive polyethyleneimine was obtained.

S3. Preparation of stepwise dual-temperature stimuli-responsive intelligent nanofiber: 1.0 g of the stepwise dual-temperature stimuli-responsive polyethyleneimine and 1.0 g of the carboxylated cellulose nanofiber were dispersed into 25 mL of water, and after 30 minutes of ultrasonic treatment (300W), a reaction was carried out at 100° C. for 9 hours. Then, centrifugation (4800 r/min, 10 minutes) was carried out until a supernatant showed neutral. A precipitate was freeze-dried, and the stepwise dual-temperature stimuli-responsive intelligent nanofiber was obtained.

S4. Preparation of a stepwise dual-temperature/near-infrared stimuli-responsive intelligent nanofiber: 2 mL of a 30 wt % ammonium hydroxide solution was added to a mixed solution of 40 mL of ethanol and 90 mL of water to obtain a mixed solution of ethanol/water/ammonium hydroxide, followed by 30 minutes of stirring. 0.2 g of dopamine hydrochloride powder was dissolved in 30 mL of water, and then a dopamine aqueous solution obtained was mixed with 1.0 g of the stepwise dual-temperature stimuli-responsive intelligent nanofiber in the mixed solution of ethanol/water/ammonium hydroxide. Under ultrasonic treatment (300W), reaction was carried out in dark for 5 hours with stirring, and after the reaction was finished, a mixture was washed with water for several times, dispersed again into water, centrifuged (4800 r/min, 10 minutes) and freeze-dried.

S5. Preparation of a hyperbranched polyamine:diethylenetriamine was dissolved in absolute methanol according to a volume ratio of 9:5, and methyl acrylate was dissolved in absolute methanol according to a volume ratio of 2:5. Nitrogen was charged into the diethylenetriamine solution, and the methyl acrylate solution was dropwise added to the diethylenetriamine solution according to a volume ratio of 1:1 at 0° C. under stirring. Then, a reaction was carried out at normal temperature for 18 hours, and a hyperbranched polyamine precursor was obtained. The hyperbranched polyamine precursor was evaporated at 70° C. for 0.5 hour, followed by increasing the temperature to 100° C. and 140° C. successively and reacting respectively for 2 hours, and a hyperbranched polyamine was obtained.

S6. One-step crosslink by using a crosslinking agent: the stepwise dual-temperature/near-infrared stimuli-responsive intelligent nanofiber and the hyperbranched polyamine were mixed according to a mass ratio of 1:1, and dispersed in a 4 wt % NaOH aqueous solution (a mass/volume ratio of the stepwise dual-temperature/near-infrared stimuli-responsive intelligent nanofiber to the NaOH aqueous solution is 1 g: 100 mL). Epichlorohydrin (a mass ratio of the stepwise dual-temperature/near-infrared stimuli-responsive intelligent nanofiber to epichlorohydrin is 1:0.3) was added under stirring at a speed of 100 r/min and subjected to a cross-linking reaction for 10 minutes, and a near-infrared regenerative intelligent fiber-based adsorptive material was obtained.

Embodiment 2

S1. Preparation of a carboxylated cellulose nanofiber: 4 g of absolute dry bagasse pulp fiber was added to a conical flask, 200 mL of a potassium hydrogen phthalate buffer solution (0.05M, pH=3) and then 2.4 g of sodium periodate were added, and after the conical flask was wrapped with tinfoil, a mixture in the conical flask was stirred at 35° C. for 4 hours followed by adding 10 mL of ethylene glycol to terminate the reaction. A product was subjected to suction filtration, washed and dried to obtain dialdehyde fiber. 2 g of dialdehyde fiber was added with 180 mL of a sodium phosphate buffer solution (0.05M, pH=6.8), and a suspension liquid was stirred at 60° C. in a sealed flask with a stirring speed of 500 rpm, then 0.032 g of TEMPO, subsequently 1.183 mL of a 1.69M sodium hypochlorite solution and finally 2.1307 g of sodium chlorite were added. After 16 hours of oxidation, 5 mL of ethanol was added for quenching, and the carboxylated cellulose nanofiber was obtained after washing and drying.

S2. Preparation of a stepwise dual-temperature stimuli-responsive polyethyleneimine: 2.0 g of polyethyleneimine was dissolved in 10 mL of water, and 1.8 g of N-isopropyl acrylamide was dissolved in 30 mL of water. At 60° C. under magnetic stirring, 10 mL of the polyethyleneimine aqueous solution was dropwise added to 30 mL of the N-isopropyl acrylamide aqueous solution, and after 24 hours of reaction, quenching was carried out by using liquid nitrogen. All solutions obtained were dialyzed with the MWCO500D dialysis bag in water for 24 hours, and then freeze-dried to obtain the polyethyleneimine modified by N-isopropyl acrylamide. Lower critical solution temperature (LCST) of a lower temperature stage was regulated and controlled within the range of 30–37° C. by controlling an addition amount of N-isopropyl acrylamide. 2.0 g of polyethyleneimine was dissolved in 30 mL of water, and 2.4 g of dimethylamino ethyl methacrylate was dissolved in 30 mL of water. At 60° C. under magnetic stirring, 30 mL of the polyethyleneimine aqueous solution was dropwise added to 30 mL of the dimethylamino ethyl methacrylate aqueous solution, and after 24 hours of reaction, quenching was carried out by using liquid nitrogen. All solutions obtained were dialyzed with the MWCO500D dialysis bag in water for 24 hours, and then freeze-dried to obtain the polyethyleneimine modified by dimethylamino ethyl methacrylate. Lower critical solution temperature (LCST) of a higher temperature stage was regulated and controlled within the range of 40–50° C. by controlling an addition amount of dimethylamino ethyl methacrylate. The polyethyleneimine modified by dimethylamino ethyl methacrylate and the polyethyleneimine modified by N-isopropyl acrylamide were mixed according to a mass-equivalent ratio, and the stepwise dual-temperature stimuli-responsive polyethyleneimine was obtained.

S3. Preparation of stepwise dual-temperature stimuli-responsive intelligent nanofiber: 2.0 g of the stepwise dual-temperature stimuli-responsive polyethyleneimine and 1.0 g of the carboxylated cellulose nanofiber were dispersed into 35 mL of water, and after 30 minutes of ultrasonic treatment (300W), a reaction was carried out at 100° C. for 9.6 hours. Then, centrifugation (4800 r/min, 10 minutes) was carried out until a supernatant showed neutral. A precipitate was freeze-dried, and the stepwise dual-temperature stimuli-responsive intelligent nanofiber was obtained.

S4. Preparation of a stepwise dual-temperature/near-infrared stimuli-responsive intelligent nanofiber: 2 mL of a 30 wt % ammonium hydroxide solution was added to a mixed solution of 40 mL of ethanol and 90 mL of water to obtain a mixed solution of ethanol/water/ammonium hydroxide, followed by 30 minutes of stirring. 0.6 g of dopamine hydrochloride powder was dissolved in 30 mL of water, and then a dopamine aqueous solution obtained was mixed with 1.0 g of the stepwise dual-temperature stimuli-responsive intelligent nanofiber in the mixed solution of ethanol/water/ammonium hydroxide. Under ultrasonic treatment (300W), reaction was carried out in dark for 7 hours with stirring, and after the reaction was finished, a mixture was washed with water for several times, dispersed again into water, centrifuged (4800 r/min, 10 minutes) and freeze-dried.

S5. Preparation of a hyperbranched polyamine: triethylenetetramine was dissolved in absolute methanol according to a volume ratio of 9.6:5, and methyl acrylate was dissolved in absolute methanol according to a volume ratio of 2.7:5. Nitrogen was charged into the triethylenetetramine solution, and the methyl acrylate solution was dropwise added to the triethylenetetramine solution according to a volume ratio of 1:1 at 0° C. under stirring. Then, a reaction was carried out at normal temperature for 22 hours, and a hyperbranched polyamine precursor was obtained. The hyperbranched polyamine precursor was evaporated at 65° C. for 1.0 hour, followed by increasing the temperature to 100° C. and 140° C. successively and reacting respectively for 2.5 hours, and a hyperbranched polyamine was obtained.

S6. One-step crosslink by using a crosslinking agent: the stepwise dual-temperature/near-infrared stimuli-responsive intelligent nanofiber and the hyperbranched polyamine were mixed according to a mass ratio of 1:5, and dispersed in a 3 wt % NaOH aqueous solution (a mass/volume ratio of the stepwise dual-temperature/near-infrared stimuli-responsive intelligent nanofiber to the NaOH aqueous solution is 1 g: 240 mL). Epichlorohydrin (a mass ratio of the stepwise dual-temperature/near-infrared stimuli-responsive intelligent nanofiber to epichlorohydrin is 1:0.6) was added under stirring at a speed of 500 r/min and subjected to a cross-linking reaction for 25 minutes, and a near-infrared regenerative intelligent fiber-based adsorptive material was obtained.

Embodiment 3

S1. Preparation of a carboxylated cellulose nanofiber: 4 g of absolute dry bagasse pulp fiber was added to a conical flask, 200 mL of a potassium hydrogen phthalate buffer solution (0.05M, pH=3) and then 3.0 g of sodium periodate were added, and after the conical flask was wrapped with tinfoil, a mixture in the conical flask was stirred at 40° C. for 3.5 hours followed by adding 10 mL of ethylene glycol to terminate the reaction. A product was subjected to suction filtration, washed and dried to obtain dialdehyde fiber. 2 g of dialdehyde fiber was added with 180 mL of a sodium phosphate buffer solution (0.05M, pH=6.8), and a suspension liquid was stirred at 65° C. in a sealed flask with a stirring speed of 500 rpm, then 0.035 g of TEMPO, subsequently 1.183 mL of a 1.69M sodium hypochlorite solution and finally 2.1307 g of sodium chlorite were added. After 15 hours of oxidation, 5 mL of ethanol was added for quenching, and the carboxylated cellulose nanofiber was obtained after washing and drying.

S2. Preparation of a stepwise dual-temperature stimuli-responsive polyethyleneimine: 2.5 g of polyethyleneimine was dissolved in 10 mL of water, and 2.7 g of N-isopropyl acrylamide was dissolved in 30 mL of water. At 65° C. under magnetic stirring, 10 mL of the polyethyleneimine aqueous solution was dropwise added to 30 mL of the N-isopropyl acrylamide aqueous solution, and after 26 hours of reaction, quenching was carried out by using liquid nitrogen. All solutions obtained were dialyzed with the MWCO500D dialysis bag in water for 26 hours, and then freeze-dried to obtain the polyethyleneimine modified by N-isopropyl acrylamide. Lower critical solution temperature (LCST) of a lower temperature stage was regulated and controlled within the range of 30–37° C. by controlling an addition amount of N-isopropyl acrylamide. 2.1 g of polyethyleneimine was dissolved in 30 mL of water, and 3.0 g of dimethylamino ethyl methacrylate was dissolved in 30 mL of water. At 65° C. under magnetic stirring, 30 mL of the polyethyleneimine aqueous solution was dropwise added to 30 mL of the dimethylamino ethyl methacrylate aqueous solution, and after 26 hours of reaction, quenching was carried out by using liquid nitrogen. All solutions obtained were dialyzed with the MWCO500D dialysis bag in water for 26 hours, and then freeze-dried to obtain the polyethyleneimine modified by dimethylamino ethyl methacrylate. Lower critical solution temperature (LCST) of a higher temperature stage was regulated and controlled within the range of 40–50° C. by controlling an addition amount of dimethylamino ethyl methacrylate. The polyethyleneimine modified by dimethylamino ethyl methacrylate and the polyethyleneimine modified by N-isopropyl acrylamide were mixed according to a mass-equivalent ratio, and the stepwise dual-temperature stimuli-responsive polyethyleneimine was obtained.

S3. Preparation of stepwise dual-temperature stimuli-responsive intelligent nanofiber: 2.7 g of the stepwise dual-temperature stimuli-responsive polyethyleneimine and 1.0 g of the carboxylated cellulose nanofiber were dispersed into 50 mL of water, and after 30 minutes of ultrasonic treatment (300W), a reaction was carried out at 100° C. for 10 hours. Then, centrifugation (4800 r/min, 10 minutes) was carried out until a supernatant showed neutral. A precipitate was freeze-dried, and the stepwise dual-temperature stimuli-responsive intelligent nanofiber was obtained.

S4. Preparation of a stepwise dual-temperature/near-infrared stimuli-responsive intelligent nanofiber: 2 mL of a 30 wt % ammonium hydroxide solution was added to a mixed solution of 40 mL of ethanol and 90 mL of water to obtain a mixed solution of ethanol/water/ammonium hydroxide, followed by 30 minutes of stirring. 0.8 g of dopamine hydrochloride powder was dissolved in 30 mL of water, and then a dopamine aqueous solution obtained was mixed with 1.0 g of the stepwise dual-temperature stimuli-responsive intelligent nanofiber in the mixed solution of ethanol/water/ammonium hydroxide. Under ultrasonic treatment (300W), reaction was carried out in dark for 8 hours with stirring, and after the reaction was finished, a mixture was washed with water for several times, dispersed again into water, centrifuged (4800 r/min, 10 minutes) and freeze-dried.

S5. Preparation of a hyperbranched polyamine:tetraethylenepentamine was dissolved in absolute methanol according to a volume ratio of 10:5, and methyl acrylate was dissolved in absolute methanol according to a volume ratio of 3:5. Nitrogen was charged into the tetraethylenepentamine solution, and the methyl acrylate solution was dropwise added to the tetraethylenepentamine solution according to a volume ratio of 1:1 at 0° C. under stirring. Then, a reaction was carried out at normal temperature for 24 hours, and a hyperbranched polyamine precursor was obtained. The hyperbranched polyamine precursor was evaporated at 60° C. for 1.5 hours, followed by increasing the temperature to 100° C. and 140° C. successively and reacting respectively for 3 hours, and a hyperbranched polyamine was obtained.

S6. One-step crosslink by using a crosslinking agent: the stepwise dual-temperature/near-infrared stimuli-responsive intelligent nanofiber and the hyperbranched polyamine were mixed according to a mass ratio of 1:7, and dispersed in a 1 wt % NaOH aqueous solution (a mass/volume ratio of the stepwise dual-temperature/near-infrared stimuli-responsive intelligent nanofiber to the NaOH aqueous solution is 1 g: 300 mL). Epichlorohydrin (a mass ratio of the stepwise dual-temperature/near-infrared stimuli-responsive intelligent nanofiber to epichlorohydrin is 1:0.8) was added under stirring at a speed of 800 r/min and subjected to a crosslinking reaction for 30 minutes, and a near-infrared regenerative intelligent fiber-based adsorptive material was obtained.

Properties characterization of the near-infrared regenerative intelligent fiber-based adsorptive materials prepared by Embodiments 1, 2 and 3

1. The near-infrared regenerative intelligent fiber-based adsorptive materials prepared by Embodiments 1, 2 and 3 were subjected to a dual-temperature stimuli-responsive property test. The test results all show good dual-temperature stimuli-responsive property, where the materials show hydrophilic property under the condition of 25° C. (a water contact angle is less than 30°, and the water contact angles of Embodiments 1, 2 and 3 are 16°, 15° and 13° respectively). When the temperature increases to 30-37° C., the materials show hydrophobic property (a water contact angle is more than 106°, and the water contact angles of Embodiments 1, 2 and 3 are 107°, 110° and 114° respectively). When the temperature continuously increases to 40-50° C., the materials show further increased hydrophobic property (a water contact angle is more than 125°, and the water contact angles of Embodiments 1, 2 and 3 are 126°, 129° and 130° respectively).

2. The near-infrared regenerative intelligent fiber-based adsorptive materials prepared by Embodiments 1, 2 and 3 were subjected to an adsorption/desorption property test to acidic gas. All the test results show excellent adsorption/desorption property to acidic gas, and that adsorption capacities of carbon dioxide, sulfur dioxide and hydrogen sulfide in wet state are greater than 7 mmol/g (the adsorption capacities of carbon dioxide of Embodiments 1, 2 and 3 are 7.15 mmol/g, 7.06 mmol/g and 7.05 mmol/g respectively; the adsorption capacities of sulfur dioxide of Embodiments 1, 2 and 3 are 7.14 mmol/g, 7.08 mmol/g and 7.07 mmol/g respectively; and the adsorption capacities of hydrogen sulfide of Embodiments 1, 2 and 3 are 7.04 mmol/g, 7.03 mmol/g and 7.01 mmol/g respectively). After saturated adsorption of the acidic gas, the materials can achieve desorption and regeneration under near-infrared light, that is, by using interval irradiation of 808 nm near-infrared light, the materials are enabled to reach a temperature of 37° C. and maintain for 5-10 minutes, and then to reach a temperature up to 50° C. and maintain for 5-10 minutes, so as to achieve the desorption and regeneration, where a regeneration rate is more than 95%. The materials have properties of both high adsorption capacity to acidic gas and low regeneration temperature. The materials can also be used in adsorption of acidic gas in the marsh gas and marsh gas purification, where a methane content in the purified marsh gas is greater than 98%.

What is claimed is:

1. A near-infrared regenerative intelligent fiber-based adsorptive material, characterized in that, the adsorptive material is obtained by chemically grafting a stepwise dual-temperature stimuli-responsive polyethyleneimine onto a carboxylated cellulose nanofiber matrix to prepare a stepwise dual-temperature stimuli-responsive intelligent nanofiber, and combining the stepwise dual-temperature stimuli-responsive intelligent nanofiber with a photosensitizer having near-infrared stimuli-response to prepare a stepwise dual-temperature/near-infrared stimuli-responsive intelligent nanofiber, and using a crosslinking agent to directly crosslink and combine the stepwise dual-temperature/near-infrared stimuli-responsive intelligent nanofiber with a hyperbranched polyamine in one step; wherein a stepwise dual-temperature stimuli-response of the near-infrared regenerative intelligent fiber-based adsorptive material is a stimuli-response with two temperature stages, where lower critical solution temperatures thereof respectively range from 30–37° C. and from 40-50° C.;

wherein the stepwise dual-temperature stimuli-responsive polyethyleneimine is obtained by evenly mixing in proportion a polyethyleneimine modified by N-isopropyl acrylamide and a polyethyleneimine modified by dimethylamino ethyl methacrylate; the carboxylated cellulose nanofiber is prepared by oxidizing paper pulp fiber with sodium periodate and an oxidation system containing TEMPO, where the carboxylated cellulose nanofiber has a large amount of carboxyl groups thereon; the photosensitizer having near-infrared stimuli-response is polydopamine; under ultrasonic treatment, while polymerized into polydopamine, dopamine is combined with the stepwise dual-temperature stimuli-responsive intelligent nanofiber into the stepwise dual-temperature/near-infrared stimuli-responsive intelligent nanofiber to form a composite structure having interpenetrating network; the hyperbranched polyamine is obtained by a Michael addition reaction and a self-condensation reaction of an aminating reagent with methyl acrylate; and the crosslinking agent is epichlorohydrin.

2. The near-infrared regenerative intelligent fiber-based adsorptive material according to claim 1, wherein the paper pulp fiber is one or a mixture of more of bagasse pulp fiber, *Eucalyptus* pulp fiber, bamboo pulp fiber, masson pine pulp fiber and wheat straw pulp fiber.

3. A preparation method for a near-infrared regenerative intelligent fiber-based adsorptive material, characterized in that, the preparation method comprises the following preparation steps:

S1, preparation of a carboxylated cellulose nanofiber: selectively oxidizing hydroxyl groups at C2 and C3 positions of a cellulose structural unit of paper pulp fiber into aldehyde groups by using sodium periodate to prepare dialdehyde fiber; then oxidizing the aldehyde groups at the C2 and C3 positions and a hydroxyl group at a C6 position of the cellulose structural unit of the dialdehyde fiber into carboxyl groups by using an oxidation system containing TEMPO, and regulating and controlling an oxidation degree by controlling the reaction conditions to prepare the carboxylated cellulose nanofiber;

S2, preparation of a stepwise dual-temperature stimuli-responsive polyethyleneimine: respectively subjecting N-isopropyl acrylamide and dimethylamino ethyl methacrylate to Michael addition reactions with polyethyleneimine, then evenly mixing in proportion to enable a modified polyethyleneimine to have stepwise dual-temperature stimuli-response;

S3, preparation of a stepwise dual-temperature stimuli-responsive intelligent nanofiber: subjecting the carboxylated cellulose nanofiber and the stepwise dual-temperature stimuli-responsive polyethyleneimine to an amidation reaction at high temperature;

S4, preparation of a stepwise dual-temperature/near-infrared stimuli-responsive intelligent nanofiber: mixing the stepwise dual-temperature stimuli-responsive intelligent nanofiber with dopamine, and dispersing evenly, then under ultrasonic treatment, polymerizing dopamine into polydopamine and meanwhile combining dopamine with the stepwise dual-temperature stimuli-responsive intelligent nanofiber to form a composite structure having interpenetrating network, and obtaining the stepwise dual-temperature/near-infrared stimuli-responsive intelligent nanofiber through centrifugation and freeze-drying;

S5, preparation of a hyperbranched polyamine: subjecting an aminating reagent and methyl acrylate to a Michael addition reaction to generate a hyperbranched polyamine precursor, where the hyperbranched polyamine is generated by a self-condensation reaction of the hyperbranched polyamine precursor; and S6, one-step crosslink by using a crosslinking agent: evenly mixing the stepwise dual-temperature/near-infrared stimuli-responsive intelligent nanofiber prepared in the step S4 and the hyperbranched polyamine prepared in the step S5 in an alkaline solution, adding a crosslinking agent epichlorohydrin under stirring, where a mixed solution is directly crosslinked into solid particles to obtain the near-infrared regenerative intelligent fiber-based adsorptive material.

4. The preparation method according to claim 3, wherein specific operation of the step S1 is as follows: adding a potassium hydrogen phthalate buffer solution to the paper pulp fiber, then adding sodium periodate, reacting for 3.5-4.5 hours under stirring at 30-40° C., and finally adding ethylene glycol to terminate the reaction, washing, drying to obtain the dialdehyde fiber, where a mass ratio of the paper pulp fiber to sodium periodate is 4:2 to 4:3; adding a sodium phosphate buffer solution to the dialdehyde fiber, evenly mixing at 55-65° C., then adding TEMPO, adding a sodium hypochlorite solution, then adding sodium chlorite, oxidizing for 15-17 hours, adding ethanol for quenching, washing, drying to obtain the carboxylated cellulose nanofiber, where a mass ratio of the dialdehyde fiber to TEMPO is 400:6 to 400:7.

5. The preparation method according to claim 3, wherein specific operation of the step S2 is as follows: at 55-65° C. under magnetic stirring, dropwise adding a polyethyleneimine aqueous solution with a concentration of 0.15-0.25 g/mL to a N-isopropyl acrylamide aqueous solution with a concentration of 0.03-0.09 g/mL, a volume ratio of the polyethyleneimine aqueous solution with the concentration of 0.15-0.25 g/mL to the N-isopropyl acrylamide aqueous solution with the concentration of 0.03-0.09 g/mL is 1:3, and after reacting for 22-26 hours, quenching with liquid nitrogen, dialyzing an obtained solution with a MWCO500D dialysis bag in water for 22-26 hours, then freeze-drying to obtain a polyethyleneimine modified by N-isopropyl acrylamide, regulating and controlling a lower critical solution temperature of a lower temperature stage within the range of 30-37° C. by controlling an addition amount of N-isopropyl acrylamide; at 55-65° C. under magnetic stirring, dropwise adding a polyethyleneimine aqueous solution with a concentration of 0.06-0.07 g/mL to a dimethylamino ethyl methacrylate aqueous solution with a concentration of 0.05-0.10 g/mL according to a volume ratio of 1:1, and after reacting for 22-26 hours, quenching with liquid nitrogen, dialyzing an obtained solution with the MWCO500D dialysis bag in water for 22-26 hours, then freeze-drying to obtain a polyethyleneimine modified by dimethylamino ethyl methacrylate, regulating and controlling a lower critical solution temperature of a higher temperature stage within the range of 40–50° C. by controlling an addition amount of dimethylamino ethyl methacrylate; mixing the polyethyleneimine modified by dimethylamino ethyl methacrylate and the polyethyleneimine modified by N-isopropyl acrylamide according to a mass-equivalent ratio to obtain the stepwise dual-temperature stimuli-responsive polyethyleneimine.

6. The preparation method according to claim 3, wherein specific operation of the step S3 is as follows: dispersing the stepwise dual-temperature stimuli-responsive polyethyleneimine and the carboxylated cellulose nanofiber into water according to a mass ratio of 1:1 to 2.7:1, and after ultrasonic treatment, reacting at 100° C. for 9-10 hours, then centrifuging until a supernatant shows neutral, freeze-drying a precipitate to obtain the stepwise dual-temperature stimuli-responsive intelligent nanofiber.

7. The preparation method according to claim 3, wherein specific operation of the step S4 is as follows: adding an ammonium hydroxide solution to a mixed solution of ethanol and water to obtain a mixed solution of ethanol/water/ammonium hydroxide, mixing evenly, dissolving dopamine hydrochloride powder in water, then mixing the stepwise dual-temperature stimuli-responsive intelligent nanofiber and a dopamine aqueous solution in the mixed solution of ethanol/water/ammonium hydroxide, reacting in dark with stirring for 5-8 hours under ultrasonic treatment, and washing with water after the reaction is finished, dispersing again into water, centrifuging a mixture and freeze-drying; a mass ratio of dopamine hydrochloride to the stepwise dual-temperature stimuli-responsive intelligent nanofiber is 0.2:1 to 0.8:1.

8. The preparation method according to claim 3, wherein specific operation of the step S5 is as follows: dissolving the aminating reagent in absolute methanol, where a volume ratio of the aminating reagent to the absolute methanol is 9:5 to 10:5; dissolving methyl acrylate in the absolute methanol, where a volume ratio of the methyl acrylate to the absolute methanol is 2:5 to 3:5; charging nitrogen into the aminating reagent solution, dropwise adding the methyl acrylate solution to the aminating reagent solution according to a volume ratio of 1:1 at 0° C. under stirring, then reacting at normal temperature for 18-24 hours to obtain the hyperbranched polyamine precursor, evaporating the hyperbranched polyamine precursor at 60-70° C. for 0.5-1.5 hours, then increasing the temperature to 100° C. and 140° C. successively and reacting respectively for 2-3 hours to obtain the hyperbranched polyamine; the aminating reagent is diethylenetriamine, triethylenetetramine or tetraethylenepentamine.

9. The preparation method according to claim 3, wherein specific operation of the step S6 is as follows: mixing the stepwise dual-temperature/near-infrared stimuli-responsive intelligent nanofiber and the hyperbranched polyamine according to a mass ratio of 1:1 to 1:7, then dispersing in a 1-4 wt % NaOH aqueous solution, adding epichlorohydrin under stirring at a speed of 100-800 r/min for a crosslinking reaction for 10-30 minutes to obtain the near-infrared regenerative intelligent fiber-based adsorptive material; a mass ratio of the stepwise dual-temperature/near-infrared stimuli-responsive intelligent nanofiber to epichlorohydrin is 1:0.3 to 1:0.8, and a mass/volume ratio of the stepwise dual-temperature/near-infrared stimuli-responsive intelligent nanofiber to the NaOH aqueous solution is 1 g:100 mL to 1 g:300 mL.

10. Use of the near-infrared regenerative intelligent fiber-based adsorptive material according to claim 1 in capturing an acidic gas, wherein the acidic gas is carbon dioxide, sulfur dioxide or hydrogen sulfide; after saturated adsorption of the acidic gas, the material achieves desorption and regeneration under near-infrared light, that is, by using interval irradiation of 808 nm near-infrared light, the material is enabled to reach a temperature of 37° C. and maintain for 5-10 minutes, and then to reach a temperature up to 50° C. and maintain for 5-10 minutes, so as to achieve the desorption and regeneration of the material, where a regeneration rate is more than 95%.

11. Use of the near-infrared regenerative intelligent fiber-based adsorptive material according to claim 2 in capturing an acidic gas, wherein the acidic gas is carbon dioxide, sulfur dioxide or hydrogen sulfide; after saturated adsorption of the acidic gas, the material achieves desorption and regeneration under near-infrared light, that is, by using interval irradiation of 808 nm near-infrared light, the material is enabled to reach a temperature of 37° C. and maintain for 5-10 minutes, and then to reach a temperature up to 50° C. and maintain for 5-10 minutes, so as to achieve the desorption and regeneration of the material, where a regeneration rate is more than 95%.

12. Use of the near-infrared regenerative intelligent fiber-based adsorptive material prepared by the preparation method according to claim 3 in capturing an acidic gas, wherein the acidic gas is carbon dioxide, sulfur dioxide or hydrogen sulfide; after saturated adsorption of the acidic gas, the material achieves desorption and regeneration under near-infrared light, that is, by using interval irradiation of 808 nm near-infrared light, the material is enabled to reach a temperature of 37° C. and maintain for 5-10 minutes, and then to reach a temperature up to 50° C. and maintain for 5-10 minutes, so as to achieve the desorption and regeneration of the material, where a regeneration rate is more than 95%.

13. Use of the near-infrared regenerative intelligent fiber-based adsorptive material prepared by the preparation method according to claim 4 in capturing an acidic gas, wherein the acidic gas is carbon dioxide, sulfur dioxide or hydrogen sulfide; after saturated adsorption of the acidic gas, the material achieves desorption and regeneration under near-infrared light, that is, by using interval irradiation of 808 nm near-infrared light, the material is enabled to reach a temperature of 37° C. and maintain for 5-10 minutes, and then to reach a temperature up to 50° C. and maintain for 5-10 minutes, so as to achieve the desorption and regeneration of the material, where a regeneration rate is more than 95%.

14. Use of the near-infrared regenerative intelligent fiber-based adsorptive material prepared by the preparation method according to claim 5 in capturing an acidic gas, wherein the acidic gas is carbon dioxide, sulfur dioxide or hydrogen sulfide; after saturated adsorption of the acidic gas, the material achieves desorption and regeneration under near-infrared light, that is, by using interval irradiation of 808 nm near-infrared light, the material is enabled to reach a temperature of 37° C. and maintain for 5-10 minutes, and then to reach a temperature up to 50° C. and maintain for 5-10 minutes, so as to achieve the desorption and regeneration of the material, where a regeneration rate is more than 95%.

15. Use of the near-infrared regenerative intelligent fiber-based adsorptive material prepared by the preparation method according to claim 6 in capturing an acidic gas, wherein the acidic gas is carbon dioxide, sulfur dioxide or hydrogen sulfide; after saturated adsorption of the acidic gas, the material achieves desorption and regeneration under near-infrared light, that is, by using interval irradiation of 808 nm near-infrared light, the material is enabled to reach a temperature of 37° C. and maintain for 5-10 minutes, and then to reach a temperature up to 50° C. and maintain for 5-10 minutes, so as to achieve the desorption and regeneration of the material, where a regeneration rate is more than 95%.

16. Use of the near-infrared regenerative intelligent fiber-based adsorptive material prepared by the preparation method according to claim 7 in capturing an acidic gas, wherein the acidic gas is carbon dioxide, sulfur dioxide or hydrogen sulfide; after saturated adsorption of the acidic gas, the material achieves desorption and regeneration under near-infrared light, that is, by using interval irradiation of 808 nm near-infrared light, the material is enabled to reach a temperature of 37° C. and maintain for 5-10 minutes, and then to reach a temperature up to 50° C. and maintain for 5-10 minutes, so as to achieve the desorption and regeneration of the material, where a regeneration rate is more than 95%.

17. Use of the near-infrared regenerative intelligent fiber-based adsorptive material prepared by the preparation method according to claim 8 in capturing an acidic gas, wherein the acidic gas is carbon dioxide, sulfur dioxide or hydrogen sulfide; after saturated adsorption of the acidic gas, the material achieves desorption and regeneration under near-infrared light, that is, by using interval irradiation of 808 nm near-infrared light, the material is enabled to reach a temperature of 37° C. and maintain for 5-10 minutes, and then to reach a temperature up to 50° C. and maintain for 5-10 minutes, so as to achieve the desorption and regeneration of the material, where a regeneration rate is more than 95%.

18. Use of the near-infrared regenerative intelligent fiber-based adsorptive material prepared by the preparation method according to claim 9 in capturing an acidic gas, wherein the acidic gas is carbon dioxide, sulfur dioxide or hydrogen sulfide; after saturated adsorption of the acidic gas, the material achieves desorption and regeneration under near-infrared light, that is, by using interval irradiation of 808 nm near-infrared light, the material is enabled to reach a temperature of 37° C. and maintain for 5-10 minutes, and then to reach a temperature up to 50° C. and maintain for 5-10 minutes, so as to achieve the desorption and regeneration of the material, where a regeneration rate is more than 95%.

* * * * *